United States Patent [19]

Chen

[11] Patent Number: 4,646,343
[45] Date of Patent: Feb. 24, 1987

[54] ROBBERY-REPELLING ALARM SYSTEM

[76] Inventor: Yung-Shen Chen, 10-4 Fl., 62, Chang Chun Rd., Taipei, Taiwan

[21] Appl. No.: 484,861

[22] Filed: Apr. 14, 1983

[51] Int. Cl.$^4$ ............................................. H04M 11/04
[52] U.S. Cl. ........................................ 379/40; 379/41; 379/44
[58] Field of Search .................. 179/5 R, 5 P, 6.02, 179/90 BD; 340/63, 64, 65, 692

[56] References Cited

U.S. PATENT DOCUMENTS

| | | | |
|---|---|---|---|
| 3,274,346 | 9/1966 | Silber | 179/5 R X |
| 3,287,500 | 11/1966 | Moore, Jr. | 179/6.02 X |
| 3,632,879 | 1/1972 | Freisinger | 179/5 P |
| 3,656,102 | 4/1972 | Hale et al. | 340/64 |
| 3,700,813 | 10/1972 | Colman | 179/5 P |
| 3,909,842 | 9/1975 | Noji | 340/692 X |
| 3,938,120 | 2/1976 | O'Connell | 179/5 P X |
| 4,123,745 | 10/1978 | Gurgone | 340/63 |
| 4,389,639 | 6/1983 | Torii et al. | 340/692 X |

FOREIGN PATENT DOCUMENTS

| | | | |
|---|---|---|---|
| 60-104434 | 6/1985 | Japan | 340/63 |
| 117926 | 10/1969 | Norway | 179/5 R |

Primary Examiner—Keith E. George

[57] ABSTRACT

A robbery-repelling alarm system includes a shouting alarm which will produce a human warning speech prerecorded in a first cassette tape for efficiently repelling intruders; a car lock which will be actuated by intruder to ground the current of the engine ignition coil to prevent the car starting; and a telephone dialing alarm including both a pulse dialer and a prerecorded message alarm operated by a second cassette tape for easier operation and minor cost.

8 Claims, 5 Drawing Figures

ROBBERY-REPELLING ALARM SYSTEM

BACKGROUND OF THE INVENTION

Conventional burglar alarm systems may include ultrasonics, microwave, infra-red, bells and many other systems. The nerve centre of any alarm system is the control panel. It is where all the detection circuits terminate, and where electronics monitor the circuit for the continuous presence of a voltage. When the detection equipment is disturbed, the circuit is broken and the control panel immediately registers the loss of voltage and activates bells or sirens, warning of an intrusion.

For those conventional burglar alarm systems used in homes by families, the bells, buzzers or sirens are electronically or mechanically actuated for sounding which may reduce their alarming efficiency because the electronic or mechanical sounding will not indicate the true condition to ask for help once a robber or a thief intrudes. The universal sounding is almost the same among so many warning or alarming conditions, to thereby easily cause confusion to influence the protective measures.

The conventional burglar systems used in cars are always formed with ultrasonic or microwave units which, however, may be subject to false alarms because in certain conditions, any movement outside a protected area may trigger an alarm.

Although conventional telephone dialing equipment has been disclosed, a prerecorded alarming recorder should be separately provided to increase the installation cost of such a telephone dialing alarm.

The present inventor has found the defects of conventional burglar alarms and invented the present robbery-repelling alarm system.

SUMMARY OF THE INVENTION

One object of the present invention is to provide a shouting alarm which may produce a human warning speech to efficiently repel the burglars or report the condition being robbed or ask help from the relevant sources.

Another object of the present invention is to provide an engine locking means so that once a car is intruded, the ignition coil will not be operated as the contactor-breaker is deactivated by the intruder.

Still another object of the present invention is to provide a simplified telephone dialing alarm wherein both the pulse dialing and prerecorded message alarming may be operated by means of a common cassette tape so as to simplify the construction and reduce the cost of the dialing alarm.

DETAILED DESCRIPTION

Figure 1:
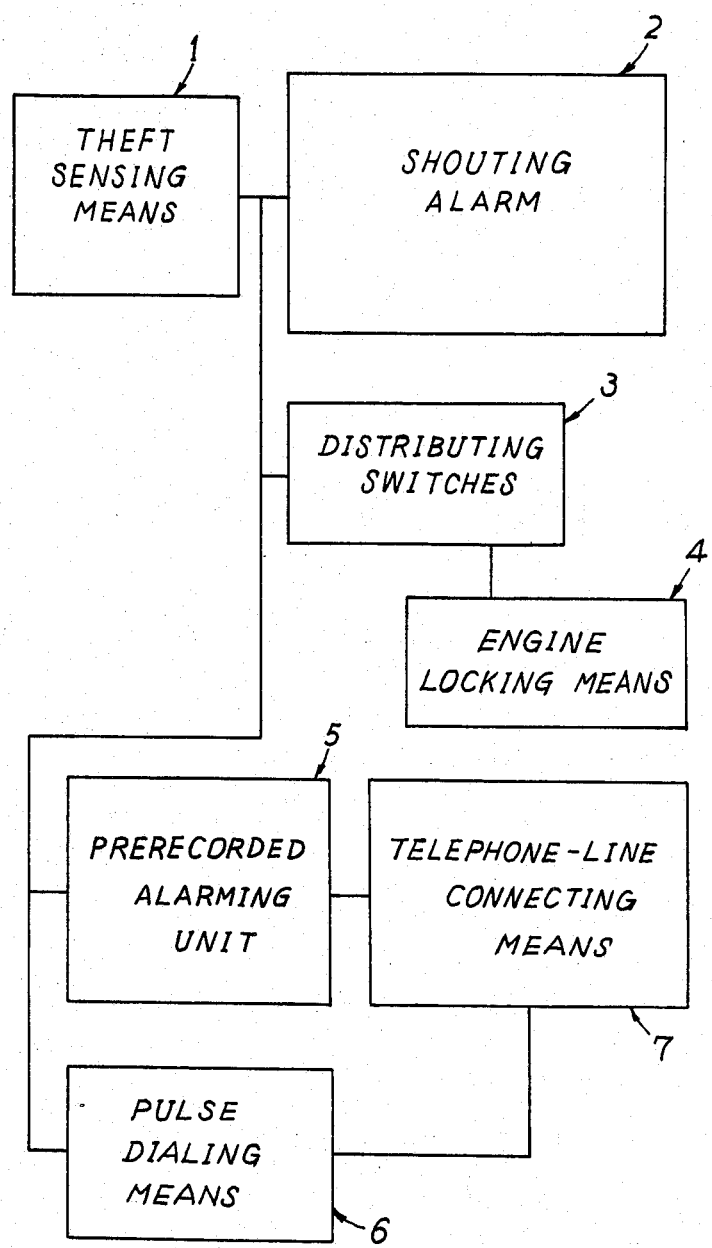
FIG. 1 is a block diagram of the present invention.
Figure 2:
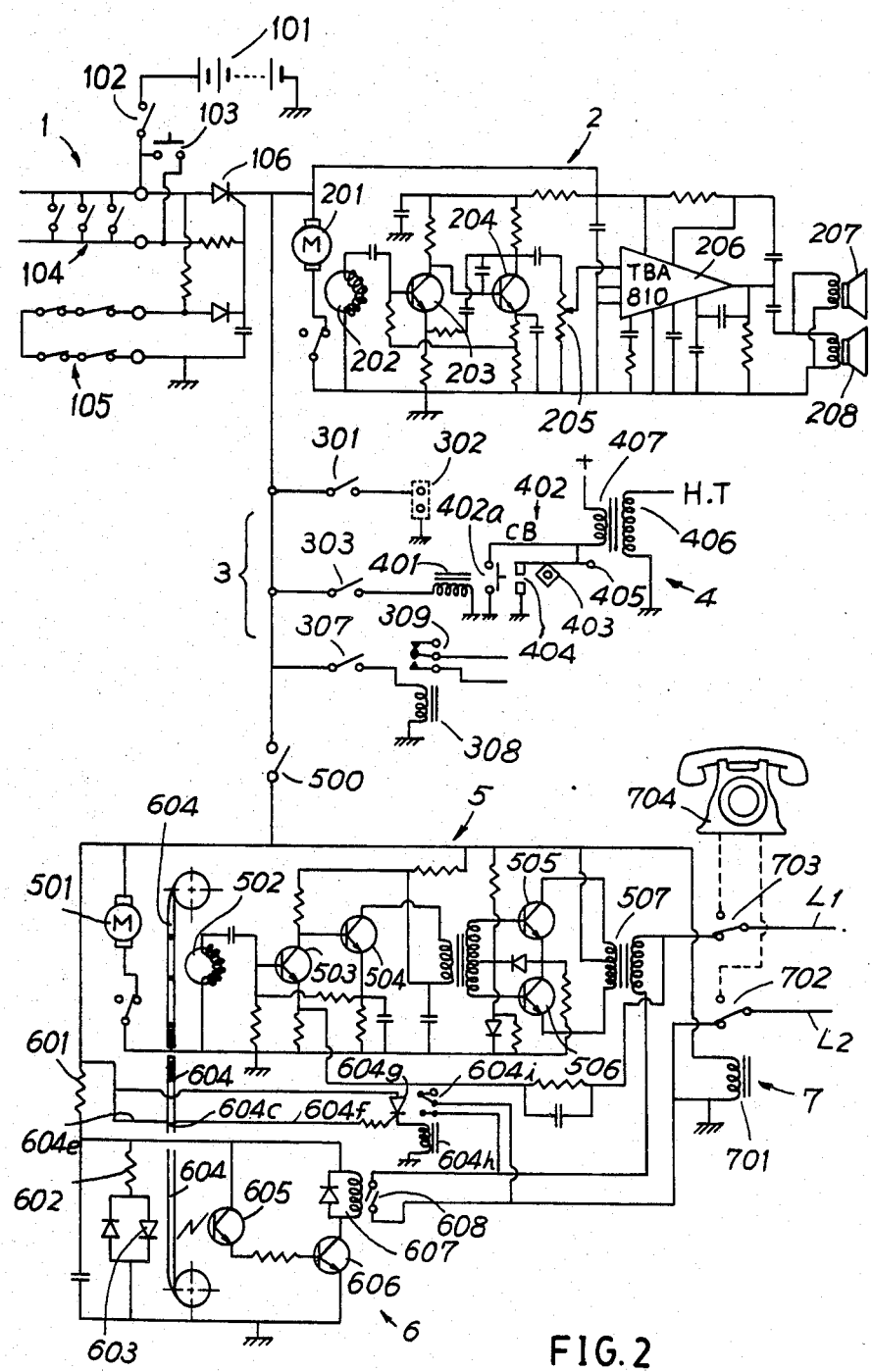
FIG. 2 is a circuit illustration of the present invention.

As shown in FIGS. 1 and 2, the present invention comprises a theft sensing means 1, a shouting alarm 2, several distributing switches 3, an engine locking means 4, and a telephone dialing alarm which comprises a prerecorded alarming unit 5, a pulse dialing means 6 and a telephone-line connecting means 7.

The theft sensing means 1 comprises a power source 101, a main switch 102, a manual switch 103, a group of sensing switches connected in parallel 104, a group of sensing switches connected in series 105 and a silicon-controlled rectifier 106. The sensing switches connected in parallel 104 are normally open and the sensing switches connected in series 105 are normally closed. Both groups of sensing switches 104, 105 are respectively connected between the power source 101 and a trigger of the silicon-controlled rectifier 106. The rectifier 106 is connected from power source 101 to the shouting alarm 2, the distributing switches 3 and the telephone dialing alarm 5, 6, 7.

The shouting alarm 2 comprises a driving motor 201 for driving a cassette tape (not shown) which may be prerecorded with shouting speech such as: "Help"; or "We have been robbed"; or "arrest the burglar, please"; a magnetic head 202 picking up the voice signals from the cassette tape; a pair of first amplifying transistors 203, 204; a variable resistor 205 for volume adjustment; a final amplifier 206 and two loudspeakers 207, 208 for producing clear shouting sound.

The distributing switches 3 comprises a first switch 301 for direct-current power supply through connector 302; a second switch 303 for connecting engine locking means 4 and a third switch 307 for energizing a relay 308 which may close the contacts 309 of a larger alarm unit such as a motor siren or spot light.

The engine locking means 4 comprises a relay 401 having normally open contacts 402a and a contactor-breaker 402, which comprises contact points 404 and cam breaker 403. When contacts 404 are intermittently contacted or broken by cam 403 and fulcrum 405, the secondary coil 406 of the engine ignition system will cause high tension for engine starting. However, once relay 401 is actuated by an intruder, contacts 402a will be contacted to ground the current of primary coil 407 so that the secondary coil 406 of ignition system will not be started for security purpose.

The telephone dialing alarm comprises a prerecorded alarming unit 5, a pulse dialing means 6 and a telephone-line connecting means 7. Prerecorded alarming unit 5 comprises a power switch 500; a second motor 501 for driving a second cassette tape 604; a second magnetic head 502 for receiving the signal from tape 604; the first amplifying transistors 503, 504; the final amplifying transistors 505, 506 and an output transformer 507 coupled to the connecting means 7.

Pulse dialing means 6 comprises a resistor 601 connected to the power source, a resistor 602 connected to resistor 601, an infrared-emitting diode 603, a second cassette tape 604 movably inserted between diode 603 and a photo transistor 605, a photo transistor 605 receiving the light emission from diode 603, an amplifying transistor 606 and a reed switch 607 having contacts 608 for coupling output transformer 507 to telephone lines L1, L2.

Figure 3:
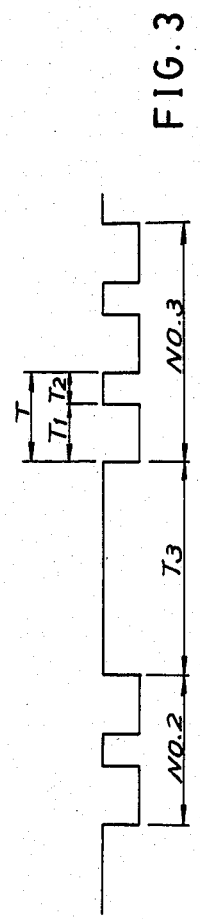
FIG. 3 is an illustration showing the telephone dialing pulses used in the present invention.
Figure 4:
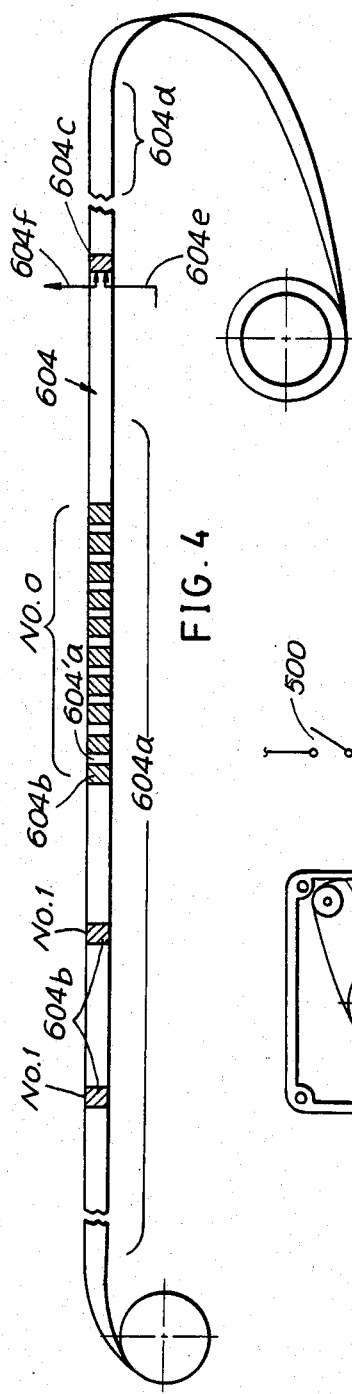
FIG. 4 shows the cassette tape used in the present invention.
Figure 5:
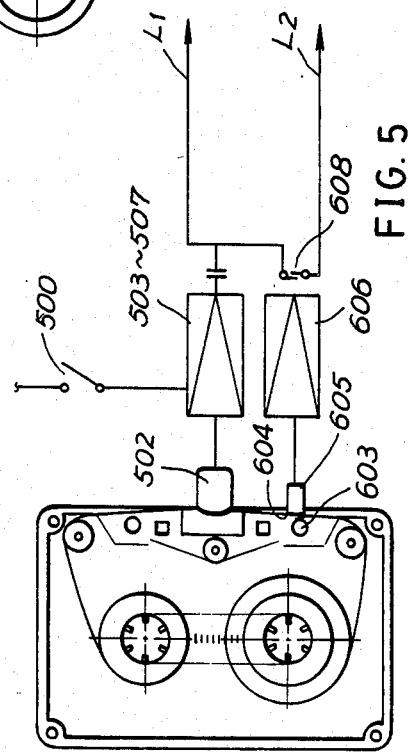
FIG. 5 is an illustration of cassette tape used in telephone dialing alarm of the present invention.

In FIG. 3, typical telephone dialing pulses are shown in that the period T of each dialing pulse is 100 milliseconds; the duration T1 of each break pulse being 66⅔ milliseconds; the duration T2 of each make pulse being 33⅓ milliseconds and the rest time interval T3 being set from 400 to 500 milli-seconds. To utilize the principles of FIG. 3 on the second cassette tape 604, the cassette tape 604 is formed as shown in FIG. 4 wherein tape 604 is formed with a transparent end 604a and the tape runs with a constant speed of 4.75 centimeters per second. Within the transparent portion 604a, several opaque zones 604b are formed adapted for calling or emergency telephone number. If "110" is taken, for instance, as emergency telephone number for calling for police help, the length of opaque zone equivalent to telephone number "1" is obtained by following calculation:

1 break pulse=66.66 milli-second 4.75 cm/sec X 66.66/1000 sec=0.3166 cm.

Hence, the number "1" occupies a length of 0.3166 cm which is made as opaque zone 604b. For number "0", each breaking pulse should be formed with an opaque zone 604b and then continued with a make pulse made as transparent zone 604'a having half the length of opaque zone 604b. Each single telephone number is separated from another single number by a tape length equivalent to the lapse of rest time interval T3. After the transparent end 604a and opaque zones 604b, a sensor 604c, such as adhered with aluminum foil on tape 604, is formed to couple the output transformer 507 to telephone lines 61, 62.

Sensor 604c as shown in FIGS. 4 and 2 is frictionally connected to the power source through a wire 604e and connected to a silicon-controlled rectifier 604g by another wire 604f. Rectifier 604g is then connected to a relay 604h which actuates contacts 604i for coupling output transformer 507 to telephone lines L1, L2.

Telephone-line connecting means 7 comprises a double-pole and double-throw relay 701 which may shift the contacts 702, 703 originally connected to telephone set 704 to the telephone dialing alarm system for emergency calling.

When any intruder actuates the sensing means 1 of the present invention either by closing switches 104 or opening switches 105, the silicon-controlled rectifier 106 will be turned on to operate shouting alarm 2 to produce human speech to report an intrusion or ask for help. If the present invention is installed in a car, the power is supplied to switches 3 to energize relay 401 which will attract contact 402a to ground the current of primary coil 407 and contacter-breaker 402 so that the high tension of ignition coil 406 wil not be produced and the car engine can not be started for higher security. As the telephone dialing alarm is powered when intruded, the double pole double-throw relay 701 will be actuated to shift contacts 702, 703 to connect the diaing alarm to outgoing telephone lines L1, L2. The motor 501 will drive cassette tape 604 in which the opaque zone 604b will not transmit the light emitted from diode 603 so as to become a break pulse and the transparent portion 604a, 604'a will transmit the light to actuate phototransistor 605 so as to close contacts 608 of reed switch 607 and couple output transformer 507 with telephone line L1, L2 to produce make pulse for pulse dialing such as calling to police or other helping sources. Once the sensor 604c, during running of tape 604, is frictionally contacted, the silicon-controlled rectifier 604g will be turned on to close the contacts 604i for coupling transformer 507 to telephone lines L1, L2. The remaining tape 604 as prerecorded alarm message will automatically report to police or other sources.

The present invention is superior to any conventional burglar alarm system because it has the following advantages:

1. The shouting means 2 will produce true human speech to ask for help or report an intrusion, and the human speech is more efficient than conventional electronic or mechanical sound in repelling robbers or thiefs.

2. Car locking means 4 prevents a thief from starting the car engine for substantially protecting the car.

3. The specially treated cassette tape 604 of the present invention simplifies the construction of prerecoded alarming and pulse dialing machines for easier operation, minor cost and less maintenance problems.

I claim:

1. A robbery-repelling alarm system for an automobile comprising:

theft sensing means composed of a group of sensing switches connected in parallel, a group of sensing switches connected in series, a silicon-controlled rectifier connected between a power source and both groups of sensing switches; a shouting alarm which comprises a driving motor for driving a prerecorded cassette tape, a magnetic head receiving signals from said cassette tape, first amplifying transistors and a final amplifier amplifying singals from the magnetic head and a pair of loudspeakers for producing human warning speech from signals from the final amplifier; several distributing switches connected to the power source and means for locking the engine of the automobile in response to operation of said distributing switches, wherein the locking means comprises a relay and a contactor breaker actuating an ignition coil of the engine ignition system; and a telephone dialing alarm which comprises a prerecorded alarming unit, a pulse dialing means and means for connecting the prerecorded alarming unit and the pulse dialing means to a telephone line, wherein the prerecorded alarming unit and pulse dialing means both use a second cassette tape of which one end is transparent with several opaque zones thereon to produce dialing pulses for an emergency call and the remaining tape is prerecorded with an alarm message for reporting an intrusion or asking for help from relevant sources; wherein the shouting alarm, locking means and telephone dialing alarm are triggered by said theft sensing means.

2. A robbery-repelling alarm system according to claim 1, wherein said locking means relay is connected to one distributing switch connected to the power source so that, any intrusion energizes said relay, and contacts of said relay close to ground the electric current of the ignition coil to prevent the engine from starting; when the relay is not energized, starting is actuated by said contactor-breaker.

3. A robbery-repelling alarm system according to claim 1, wherein said prerecorded alarming unit comprises a second driving motor wherein said second cassette tape is driven by said second motor, a second magnetic head receiving signals from said second cassette tape, several amplifying transistors and an output transformer coupled to said connecting means.

4. A robbery-repelling alarm system according to claim 3 wherein said pulse dialing means comprises an infrared-emitting diode, a phototransistor facing said diode, an amplifying transistor connected to said phototransistor, a reed switch connected between the power source and said phototransistor, said reed switch having contacts operable for coupling said output transformer of said prerecorded alarming unit to said connecting means and said second cassette tape being movably inserted between said infrared-emitting diode and said photo transistor to generate dialing pulses in response to passage of the opaque zones.

5. A robbery-repelling alarm system according to claim 3, wherein the transparent end of said second cassette tape has several opaque zones separately formed on said transparent end, said opaque zones cause the pulse dialing means to generate break pulses and each zone has a length on tape which is obtained by multiplying the constant running speed of said second cassette tape with the standard time duration of a breaking pulse, each opaque zone being followed with a transparent zone of half the length of said opaque zone so the pulse dialing means generates a corresponding make pulse.

6. A robbery-repelling alarm system according to claim 5, wherein said second cassette tape is formed with a sensor which is located after said transparent end and frictionally connected to the power source; and a silicon-controlled rectifier triggered by said sensor turns on to energize a relay which closes contacts coupling the output transformer to the telephone line.

7. A robbery-repelling alarm system according to claim 6, wherein said sensor on said second cassette tape is made with aluminum foil adhered on said tape.

8. A robbery-repelling alarm system according to claim 1, wherein said connecting means comprises a double-pole and double-throw relay which may shift its contacts from a telephone set to said telephone dialing alarm once an intrusion is sensed.

* * * * *